United States Patent [19]

Ripberger et al.

[11] Patent Number: 4,716,817

[45] Date of Patent: Jan. 5, 1988

[54] PISTON, PARTICULARLY FOR INTERNAL COMBUSTION ENGINES

[75] Inventors: Emil Ripberger, Remseck; Eberhard Bubeck, Fellbach, both of Fed. Rep. of Germany

[73] Assignee: Mahle GmbH, Fed. Rep. of Germany

[21] Appl. No.: 887,437

[22] Filed: Jul. 21, 1986

[30] Foreign Application Priority Data

Jul. 27, 1985 [DE] Fed. Rep. of Germany ....... 3527032

[51] Int. Cl.$^4$ .................................................. F16J 1/00
[52] U.S. Cl. ...................................... 92/177; 92/233; 123/193 P
[58] Field of Search ............... 123/193 P; 92/233, 177

[56] References Cited

U.S. PATENT DOCUMENTS 2,309,555 1/1943 Venner ................................. 92/233
4,648,309 3/1987 Schellmann ....................... 92/177 X Primary Examiner—Harold W. Weakley
Attorney, Agent, or Firm—James C. Wray

[57] ABSTRACT

A piston, particularly for internal combustion engines, of which the bearing surfaces with which the piston comes into contact with the engine cylinder bore lie on a generated surface which runs asymmetrically to the axis of an engine cylinder accommodating the piston without clearance in the longitudinal direction of the piston and/or in the circumferential direction.

4 Claims, 6 Drawing Figures

PISTON, PARTICULARLY FOR INTERNAL COMBUSTION ENGINES

BACKGROUND TO THE INVENTION

This invention relates to a piston, particularly for internal combustion engines, comprising a head and a skirt having annular grooves therein to receive piston rings and gudgeon pin bores the bearing surfaces of which skirt come into contact with the bore of the cylinder in which it reciprocates lie on a generated surface which has an essentially circular or elliptical outer contour in all cross-sections vertical to the longitudinal axis of the piston, and in the longitudinal axis of the piston straight or curved generating lines.

It is known to make the outer contour of the generated surface in which the running surfaces of the piston lie deviate from a round or elliptical basic shape in cross-section. The generated surface also generally does not exhibit a straight course in the longitudinal direction of the piston. The pistons are instead generally barrel-shaped or convex in this direction.

The cross-section particularly of light metal pistons generaly have a round basic shape with superimposed ovalities. The small axis of ovality is always in the direction of the gudgeon pin. The difference in length between the large and small axes of ovalilty is generally of the order of 0.1–0.8 mm.

Pistons with a basic shape which is already elliptical in cross-section may also contain corresponding superimposed ovalities.

It is also known to shape the outer contour in the circumferential directiion on the thrust and anti-thrust sides of the piston differently, as shown for example in DE-AS No. 12 94 740. However, in the case of the different outer contours the two generatrices opposite each other in the connecting rod reciprocating plane run symmetrically to the longitudinal axis of the piston. Moreover, the cross-sectional contours are in mirror symmetry to the connecting rod reciprocating plane running through the longitudinal axis of the piston.

In addition to the above reference the most relevant prior art known in the applicant is as follows:
DE-PS No. 856 247
DE-PS No. 755 235
DE-OS No. 29 13 418
DE-OS No. 14 75 846
DE-AN No. A22663 XII/47 published Feb. 16, 1956
U.S. Pat. No. 34,63,957
Japanese Pat. No. 23 048-84

OBJECT OF THE INVENTION

An object of the invention is to adapt the skirt contour still further to the particular conditions of engine operation or deviations of shape in the contour of the running surfaces of the engine cylinder accommodating the piston. Quieter and more friction-free or in extreme cases seizure-resistant running should ultimately be achieved.

SUMMARY OF THE INVENTION

According to the invention there is provided a piston, particularly for internal combustion engines, comprising a head and a skirt having annular grooves therein to receive piston rings and gudgeon pin bores the bearing surfaces of which skirt come into contact with the bore of the cylinder in which it reciprocates lie on a generated surface which has an essentially circular or elliptical outer contour in all cross-sections vertical to the longitudinal axis of the piston, and in the longitudinal axis of the piston straight or curved generating lines, the improvement being that two opposite generating lines, extending at least over a considerable common part of the axial length of the piston, do not run symmetrically in the connecting rod reciprocating plane passing through the longitudinal axis of an enclosing cylinder placed without clearance around the piston.

With this solution in accordance with the invention it is possible to take the generatrix of a convex-shaped piston skirt of cylindrical basic shape in the upper shaft region closer to the generatrix of the engine cylinder on the anti-thrust side than on the thrust side. At the same time the course of the ovality on the thrust and anti-thrust sides can still be different. The following advantage can be achieved by means of a slight drawing in of the skirt in the upper region of the anti-thrust side in the case of a convex-shaped piston skirt in comparison with the shaping of the skirt contour on the thrust side.

In the region of the top dead centre high normal forces must be adsorbed on the pressure side by the piston skirt after ignition because of the oblique position of the connecting rod. These lateral forces and the ignition force itself distort the piston in a way which necessitates considerable drawing in in the upper skirt region and substantial deviations from circular shape (ovalities) in the circumferential direction.

The necessary deviations on the pressure side were also transmitted to the anti-thrust side in the case of the previous mutually symmetrical shank shape generating lines in the connecting rod reciprocating plane, although smaller distortions of the skirt exist there. During the course of the piston stroke the piston contact changes several times from the thrust to the anti-thrust side, so that a shape which is as cylindrical and circular as possible would be necessary for the piston to be well aligned; this also greatly influences the blow quantity and oil consumption. This need can be met by the envisaged asymmetrical shape in accordance with the invention.

The formation of an oblique contact picture becoming established during engine operation can additionally be avoided on the thrust and anti-thrust sides of the skirt in that the region in which the piston skirt on the thrust and anit-thrust sides actually lies against the path of the cylinder and makes itself visible in the case of the run piston because of the friction which has taken place there is generally designated as the contact picture. In the case of a piston running perfectly, essentially symmetrical contact pictures form vertically to the connecting rod reciprocating plane in the longitudinal axis of the piston. However, as is known different operating temperatures may occur over the circumference of the cylinder, which cause cylinder distortions and oblique contact pictures.

The outer surfaces of the piston running against the cylinder running surface of the engine may lie on completely differently formed generated surfaces in the region of the ring part of the piston and the piston shank, running particularly over the circumference of the piston completely asymmetrically to the axis of the engine cylinder accommodating the piston (if the piston lies against this with no clearance).

The generated surface of the piston skirt on which the piston surfaces running against the path of the cylinder lie and which are formed asymmetrically to the extent described, should in accordance with the subclaims extend at least over a height of ¼ to preferably ½ of the height of the piston skirt.

The piston does not need to have a closed running surface. The important point is merely that all the running surface regions lie on the outer contour of a an assumed generated surface indicated in accordance with the invention, so that the piston bearing surface can also be divided up into several individual regions separated from each other provided these individual regions likewise lie in the generated surface in question.

BRIEF DESCRIPTION OF DRAWINGS

Embodiments of the invention will now be described with reference to the accompanying drawings in which.

DESCRIPTION OF PREFERRED EMBODIMENT

Figure 4:
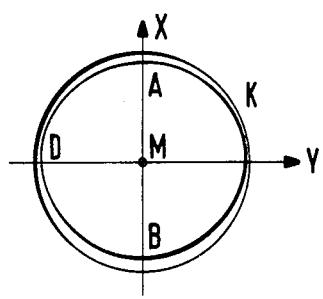
Figure 5:
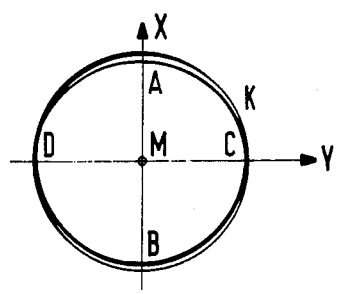

The embodiment relates to a piston of light metal with a diameter of approximately 110 mm. In the sections through the piston according to FIGS. 3-5 X designates the direction of the gudgeon pin and Y the line intersecting the connecting rod reciprocating plane with the drawing plane. Point C lies on the anti-thrust side of the piston, whilst point D lies on the thrust side of the piston. Points A and B lie on the sides of the piston adjacent to the axis of the gudgeon pin.

Figures 1, 2A, 2B:
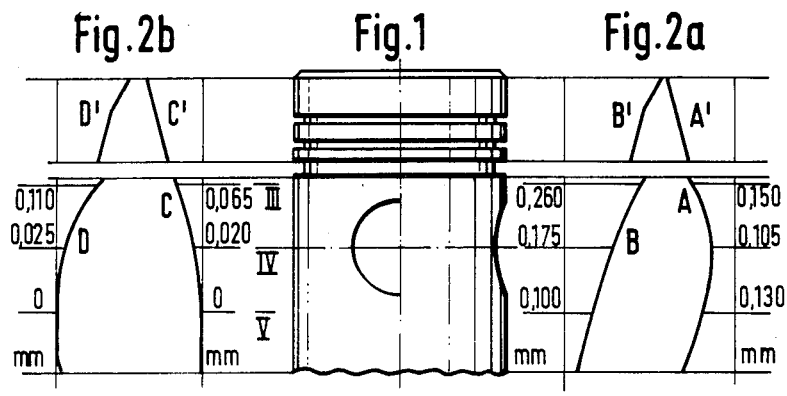
FIG. 1 comprises partial views of a piston in directions 90 degrees apart.
FIG. 2a is a profile of the piston in a plane passing through the longitudinal axis of the piston and the axis of the gudgeon pin.
FIG. 2b is a profile of the piston in the connecting rod reciprocating plane.

Circle K with centre M has a diameter which corresponds to the nominal diameter imposed by the engine cylinder, if the piston lies against the engine cylinder without clearance. In FIGS. 2a and 2b curves A to D indicate the profile of the piston skirt at the corresponding points A to D in the longitudinal direction of the piston. Curves A' to D' represent the profile of the generating lines in the ring part of the piston.

Figure 3:
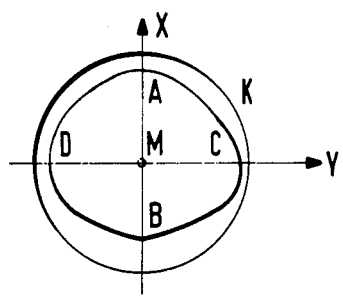
FIGS. 3-5 are profiles of the piston in three cross-sectional planes III–IV indicated in FIG. 1.

In the cross-sectional plane presented in FIG. 3, the generating line contour determined by points A to D runs asymmetrically to the axis marked by point M throughout the circumference of the piston. The dimensions entered on FIGS. 2a and 2b indicate clearly the extent to which the generating line of the piston is distant from the contour of the circle in the individual intersecting planes, at the individual points A to D.

The disymmetry of the contour of the circumference of the generating line in relation to mirror symmetry at the connecting rod reciprocating plane was chosen in the indicated manner for the embodiment in order to avoid an oblique contact picture in the piston caused by slightly distorted cylinder paths in engine operation. An engine in which point A is in the vicinity of the exhaust valve and point B is on the side of the intake valve was taken as the basis. A perfect symmetrical contact picture on the piston shank could be achieved as a result of the indicated disymmetry of the contour of the circumference of the generating line in relation to mirror symmetry at the piston canting plane.

The disymmetry of the contour of the circumference of the generating line in relation to mirror symmetry on the plane passing through the longitudinal axis of the piston rod and the axis of the gudgeon pin indicated in the embodiment, in which the distance MD on the pressure side in the upper shank region is smaller than the distance MC, has brought the following advantage.

Better alignment of the piston over the stroke length is achieved, i.e. its canting movements in the direction of the connecting rod reciprocating plane are reduced. As a result the blow quantity, the consumption of lubricating oil and the noise level caused by piston canting were reduced.

We claim:

1. A piston, particularly for internal combustion engines, comprising a head and a skirt having annular grooves therein to receive piston rings and gudgeon pin bores the bearing surfaces of which skirt come into contact with the bore of the cylinder in which it reciprocates lie on a generated surface which has an essentially circular or elliptical outer contour in all cross-sections vertical to the longitudinal axis of the piston, and in the longitudinal axis of the piston straight or curved generating lines, the improvement being that two opposite lines, extending at least over a considerable common part of the axial length of the piston, do not run symmetrically in the connecting rod reciprocating plane passing through the longitudinal axis of an enclosing cylinder placed without clearance around the piston.

2. A piston according to claim 1, wherein the opposite generating lines also do not run symmetrically to each other in the plane simultaneously stretched through the axis of the gudgeon pin bores and the longitudinal axis of the piston.

3. A piston according to claim 1, wherein the considerable common part of the length of the piston amounts to at least ¼ of the axial length of the piston skirt, measured between the end of the piston skirt and the lower edge of the lowest piston ring groove above the gudgeon pin axis.

4. A piston as claimed in claim 3, wherein said common part measures at least half of the axial length of the skirt.

* * * * *